US007833936B2

(12) United States Patent
Ohno et al.

(10) Patent No.: US 7,833,936 B2
(45) Date of Patent: Nov. 16, 2010

(54) HONEYCOMB STRUCTURE, METHOD FOR PRODUCING THE SAME, AND EXHAUST EMISSION PURIFICATION APPARATUS

(75) Inventors: Kazushige Ohno, Gifu (JP); Kazutake Ogyu, Gifu (JP); Masayuki Hayashi, Gifu (JP); Masafumi Kunieda, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 700 days.

(21) Appl. No.: 11/712,410

(22) Filed: Mar. 1, 2007

(65) Prior Publication Data

US 2007/0154728 A1 Jul. 5, 2007

Related U.S. Application Data

(63) Continuation of application No. PCT/JP2005/016027, filed on Sep. 1, 2005.

(30) Foreign Application Priority Data

Sep. 2, 2004 (JP) ............................. 2004-255875

(51) Int. Cl.
  *B01J 23/00*  (2006.01)
  *B01J 21/00*  (2006.01)
  *B01J 20/00*  (2006.01)
(52) U.S. Cl. ........................ 502/439; 502/178; 502/340; 502/341; 502/344; 502/415; 502/527.19
(58) Field of Classification Search ................ 502/340, 502/341, 344, 527.19, 178, 415, 439
See application file for complete search history.

(56) References Cited

U.S. PATENT DOCUMENTS 3,502,596 A * 3/1970 Sowards ...................... 502/100

(Continued)

FOREIGN PATENT DOCUMENTS

EP    1 319 436 A1    6/2003

(Continued)

OTHER PUBLICATIONS

Communication from European Patent Office regarding Supplementary European Search Report dated Jan. 14, 2008, on Application No. 05781345.3-2104 PCT/JP2005016027 (9 pgs.).

(Continued)

*Primary Examiner*—Cam N Nguyen
(74) *Attorney, Agent, or Firm*—Finnegan, Henderson, Farabow, Garrett & Dunner, LLP

(57) ABSTRACT

The present invention provides a method for producing a honeycomb structure which carries a catalyst component containing at least one element selected from the group consisting of alkali metals and alkaline earth metals and purifies exhaust emissions. The method of the invention includes: a starting material mixing step of mixing ceramic particles having a predetermined average particle size, fine particles being composed of the same material as the ceramic particles and having an average particle size smaller than the predetermined average particle size, and an erosion-resistant material or a precursor thereof which inhibits the catalyst component from eroding the ceramic particles more effectively than an oxide of the element contained in the ceramic particles, to prepare a puddle; a molding and firing step of molding the puddle into a molded body and firing the molded body to sinter the molded body and to allow a ceramic particle protection material composed of the erosion-resistant material or the precursor thereof to be present on the surface of the molded body; and a catalyst-carrying step of making the fired molded body to carry the catalyst component.

5 Claims, 5 Drawing Sheets

U.S. PATENT DOCUMENTS

| | | | | |
|---|---|---|---|---|
| 3,518,206 | A | * | 6/1970 | Stiles et al. .................... 502/64 |
| 3,554,929 | A | * | 1/1971 | Aarons ....................... 502/178 |
| 7,067,452 | B2 | * | 6/2006 | Tanaka et al. ................ 502/242 |
| 7,387,829 | B2 | * | 6/2008 | Ohno et al. ............... 428/306.6 |
| 7,396,586 | B2 | * | 7/2008 | Ohno et al. ................. 428/327 |
| 7,504,359 | B2 | * | 3/2009 | Ogyu et al. ................. 502/439 |
| 7,611,764 | B2 | * | 11/2009 | Komori et al. .............. 428/116 |
| 2002/0004455 | A1 | | 1/2002 | Nakanishi et al. |
| 2005/0109023 | A1 | * | 5/2005 | Kudo et al. .................... 60/311 |
| 2005/0227869 | A1 | * | 10/2005 | Ohno et al. ................. 502/439 |
| 2005/0247038 | A1 | * | 11/2005 | Takahashi .................... 55/523 |
| 2006/0051556 | A1 | * | 3/2006 | Ohno et al. ................. 428/116 |
| 2006/0159602 | A1 | * | 7/2006 | Ohno et al. ................. 422/211 |
| 2006/0166820 | A1 | * | 7/2006 | Ogyu et al. ................. 502/439 |
| 2006/0168908 | A1 | * | 8/2006 | Ichikawa et al. ........... 52/793.1 |
| 2006/0188415 | A1 | * | 8/2006 | Ohno et al. ................. 422/177 |
| 2006/0228521 | A1 | * | 10/2006 | Ohno et al. ................. 428/117 |
| 2006/0263574 | A1 | * | 11/2006 | Tsunekawa et al. ......... 428/116 |
| 2006/0292333 | A1 | * | 12/2006 | Ohno et al. ................. 428/116 |
| 2007/0116908 | A1 | * | 5/2007 | Ohno et al. ................ 428/34.4 |
| 2007/0172632 | A1 | | 7/2007 | Ohno et al. |
| 2008/0286524 | A1 | | 11/2008 | Ohno et al. |

FOREIGN PATENT DOCUMENTS

| | | |
|---|---|---|
| EP | 1 338 322 A1 | 8/2003 |
| EP | 1 759 754 A1 | 6/2005 |
| EP | 1 566 214 A1 | 8/2005 |
| EP | 1 787 968 A1 | 9/2005 |
| EP | 1 588 995 A1 | 10/2005 |
| EP | 1 652 831 A1 | 5/2006 |
| JP | 6-24636 | 4/1994 |
| JP | 2001-137714 | 5/2001 |
| JP | 2002-59009 | 2/2002 |
| JP | 2002-095968 | 4/2002 |
| WO | WO 2004/047984 A1 | 6/2004 |
| WO | WO 2005/068397 A1 | 7/2005 |

OTHER PUBLICATIONS

International Preliminary Report on Patentability (PCT/JP2005/016027).

* cited by examiner

HONEYCOMB STRUCTURE, METHOD FOR PRODUCING THE SAME, AND EXHAUST EMISSION PURIFICATION APPARATUS

CROSS-REFERENCE TO RELATED APPLICATIONS

This is a continuation of the International Patent Application No. PCT/JP2005/016027 filed on Sep. 1, 2005.

The present invention is a continuation of PCT/JP2005/016027 filed on Sep. 1, 2005, claiming priority from Japanese Patent Application No. 2004-255875 filed on Sep. 2, 2004, the entire contents of both of which are incorporated herein by reference.

BACKGROUND OF THE INVENTION

1. Field of the Invention

The present invention relates to a honeycomb structure, a method for producing the same, and an exhaust emission purification apparatus.

2. Description of the Related Art

As a method for producing a honeycomb structure that purifies (converts) exhaust emissions, various methods have been proposed in the past. For example, PCT Publication No. WO 02/020154A describes a method in which, a cordierite honeycomb carrier is first immersed in an alumina sol, followed by drying and firing, and the resulting product is wash-coated with a slurry for NOx occlusion catalyst wash-coating, followed by drying and firing to give a NOx occlusion catalyst. In the NOx occlusion catalyst, an alumina layer formed between an alkali element and the honeycomb carrier prevents the alkali element from eroding the honeycomb carrier. The contents of WO 02/020154A are incorporated herein by reference.

SUMMARY OF THE INVENTION

The present invention provides a method for producing a honeycomb structure which carries a catalyst component containing at least one element selected from the group consisting of alkali metals and alkaline earth metals and purifies exhaust emissions, the method including: a starting material mixing step of mixing ceramic particles having a predetermined average particle size, fine particles being composed of the same material as the ceramic particles and having an average particle size smaller than the predetermined average particle size, and an erosion-resistant material or a precursor thereof which inhibits the catalyst component from eroding the ceramic particles more effectively than an oxide of the element contained in the ceramic particles, to prepare a puddle; a molding and firing step of molding the puddle into a molded body and firing the molded body to sinter the molded body and to allow a ceramic particle protection material composed of the erosion-resistant material or the precursor thereof to be present on the surface of the molded body; and a catalyst-carrying step of making the fired molded body to carry the catalyst component.

In this method of the invention, it is preferable that, in the molding and firing step, during the firing of the molded body, another erosion-resistant material or a precursor thereof that is different from the erosion-resistant material or the precursor thereof contained in the molded body is made to coexist and the ceramic particle protection material allowed to be present on the surface of the molded body is also composed of the coexisting erosion-resistant material or the precursor thereof.

The present invention also provides another method for producing a honeycomb structure which carries a catalyst component containing at least one element selected from the group consisting of alkali metals and alkaline earth metals and purifies exhaust emissions, the method including: a starting material mixing step of mixing ceramic particles having a predetermined average particle size and fine particles being composed of the same material as the ceramic particles and having an average particle size smaller than the predetermined average particle size, to prepare a puddle; a molding and firing step of molding the puddle into a molded body and firing the molded body in the presence of an erosion-resistant material or a precursor thereof which inhibits the catalyst component from eroding the ceramic particles more effectively than an oxide of the element contained in the ceramic particles, to sinter the molded body and to allow a ceramic particle protection material composed of the erosion-resistant material or the precursor thereof to be present on the surface of the molded body; and a catalyst-carrying step of making the fired molded body to carry the catalyst component.

In the method of the invention, in the starting material mixing step, the ceramic particles preferably include silicon carbide. In this case, it is preferable that, in the starting material mixing step, silicon metal is further mixed to prepare the puddle. In this case, in the molding and firing step, the firing temperature for the molded body is preferably in the range of about 1,100° C. to about 1,800° C.

In the method of the invention, in the molding and firing step, the firing temperature for the molded body is preferably in the range of about 1,600° C. to about 2,200° C. In the starting material mixing step, the predetermined average particle size is preferably in the range of about 5 to about 100 μm, and the average particle size of the fine particles is preferably in the range of about 0.1 to about 10 μm. Furthermore, the erosion-resistant material preferably includes alumina.

The present invention also provides another method for producing a honeycomb structure which carries a catalyst component containing at least one element selected from the group consisting of alkali metals and alkaline earth metals and purifies exhaust emissions, the method including: a starting material mixing step of mixing ceramic particles having a predetermined average particle size, fine particles being composed of the same material as the ceramic particles and having an average particle size smaller than the predetermined average particle size, and alumina or aluminum oxycarbide, to prepare a puddle; a molding and firing step of molding the puddle into a molded body and firing the molded body to sinter the molded body and to allow a ceramic particle protection material composed of the alumina or aluminum oxycarbide to be present on the surface of the molded body; and a catalyst-carrying step of making the fired molded body to carry the catalyst component.

The present invention also provides another method for producing a honeycomb structure which carries a catalyst component containing at least one element selected from the group consisting of alkali metals and alkaline earth metals and purifies exhaust emissions, the method including: a starting material mixing step of mixing ceramic particles having a predetermined average particle size and fine particles being composed of the same material as the ceramic particles and having an average particle size smaller than the predetermined average particle size, to prepare a puddle; a molding and firing step of molding the puddle into a molded body and firing the molded body in the presence of alumina or aluminum oxycarbide to sinter the molded body and to allow a ceramic particle protection material composed of the alumina or aluminum oxycarbide to be present on the surface of the molded body; and a catalyst-carrying step of making the fired molded body to carry the catalyst component.

The present invention further provides a honeycomb structure which carries a catalyst component containing at least one element selected from the group consisting of alkali metals and alkaline earth metals and purifies exhaust emissions, including: ceramic particles which serve as an aggregate; and a ceramic particle protection material being present on the surface of the ceramic particles and being composed of an erosion-resistant material or a precursor thereof which inhibits the catalyst component from eroding the ceramic particles more effectively than an oxide of the element contained in the ceramic particles, wherein the ceramic particle protection material is present on the surface of the ceramic particles at a thickness of about 0.4 to about 1,000 nm.

In this honeycomb structure of the invention, the ceramic particles preferably include silicon carbide. The ceramic particle protection material is preferably present as a protective layer on the surface of the ceramic particles. The erosion-resistant material include preferably alumina.

The present invention further provides another honeycomb structure which carries a catalyst component containing at least one element selected from the group consisting of alkali metals and alkaline earth metals and purifies exhaust emissions, including: ceramic particles which serve as an aggregate; and a ceramic particle protection material being present on the surface of the ceramic particles and being composed of alumina or aluminum oxycarbide, wherein the ceramic particle protection material is present on the surface of the ceramic particles at a thickness of about 0.4 to about 1,000 nm.

The present invention further provides an exhaust emission purification apparatus which removes particulate matter contained in exhaust emissions from an internal combustion engine, including: a connecting pipe which is connected to the internal combustion engine and through which exhaust emissions from the internal combustion engine pass; and a honeycomb structure container which is connected to the connecting pipe and which contains the honeycomb structure of the invention with any of the arrangement described above.

In the exhaust emission purification apparatus of the invention, the ceramic particles in the honeycomb structure preferably include silicon carbide. The ceramic particle protection material in the honeycomb structure is preferably present as a protective layer on the surface of the ceramic particles. The erosion-resistant material in the honeycomb structure preferably include alumina.

BEST MODES FOR CARRYING OUT THE INVENTION

Figure 1:
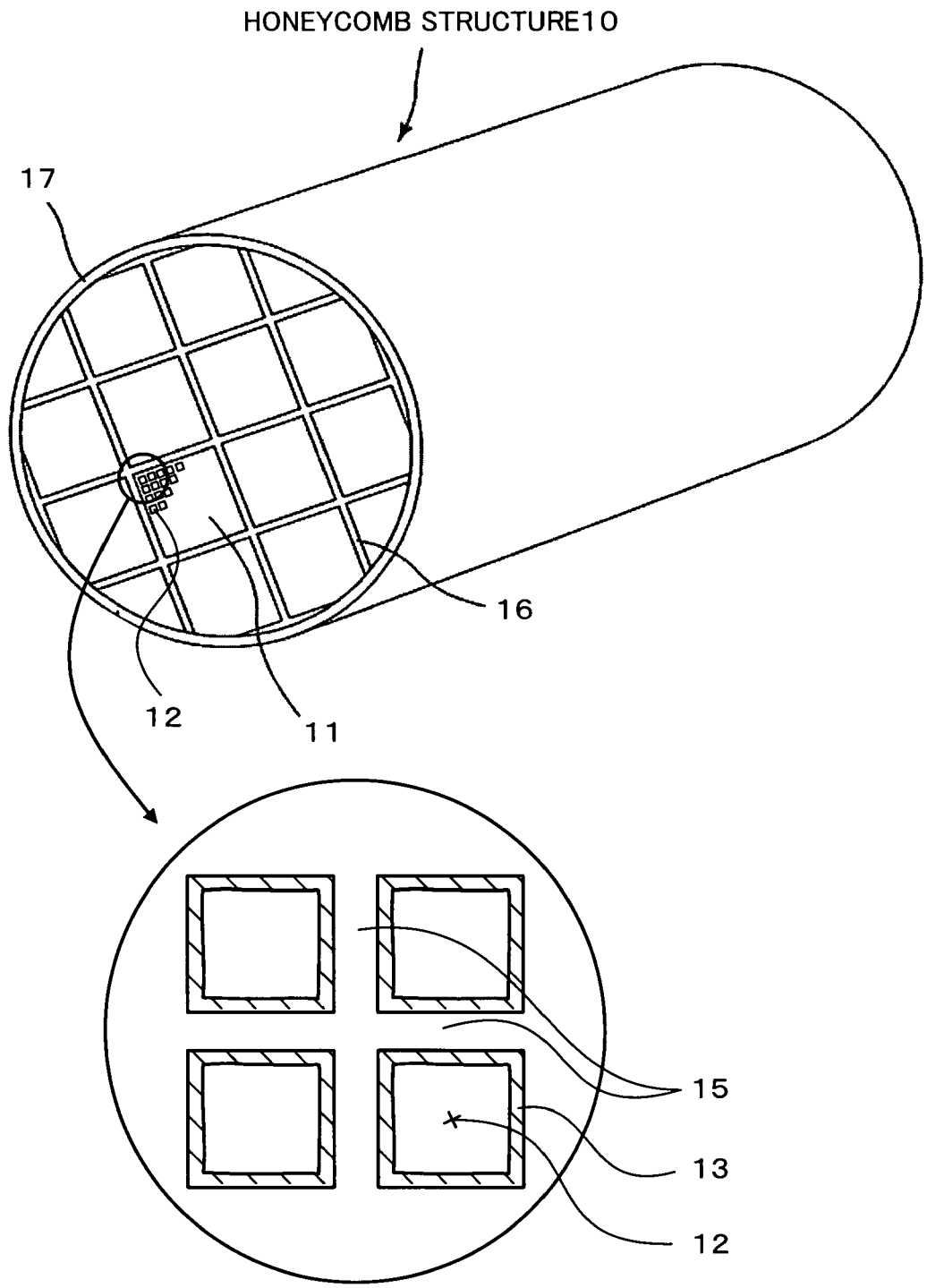
FIG. 1 is a schematic diagram showing a honeycomb structure 10 according to an embodiment of the present invention.

A method for producing a honeycomb structure according to one embodiment of the invention carries a catalyst component containing at least one element selected from the group consisting of alkali metals and alkaline earth metals and purifies (converts) exhaust emissions, the method including a starting material mixing step of mixing ceramic particles having a predetermined average particle size, fine particles being composed of the same material as the ceramic particles and having an average particle size smaller than the predetermined average particle size, and an erosion-resistant material or a precursor thereof which inhibits the catalyst component from eroding the ceramic particles more effectively than an oxide of the element contained in the ceramic particles, to prepare a puddle; a molding and firing step of molding the puddle into a molded body and firing the molded body to sinter the molded body and to allow a ceramic particle protection material composed of the erosion-resistant material or the precursor thereof to be present on the surface of the molded body; and a catalyst-carrying step of making the fired molded body to carry the catalyst component.

In the method of this embodiment, by firing the molded body composed of the puddle obtained by mixing ceramic particles, fine particles composed of the same material as the ceramic particles, and the erosion-resistant material or the precursor thereof, the molded body is sintered. By performing sintering the molded body, the ceramic particle protection material composed of the erosion-resistant material or the precursor thereof appears on the surface of the molded body. Therefore, it is not necessary to carry out a step of forming a ceramic particle protection material composed of the erosion-resistant material or the precursor thereof on the surface of the molded body, separately from the step of firing the molded body. Furthermore, the honeycomb structure obtained by this production method of the embodiment can relatively easily inhibit the catalyst component from eroding the ceramic particles more effectively compared with a structure in which an oxide of the element contained in the ceramic particles forms a ceramic particle protection material. Consequently, it is more possible to produce a honeycomb structure having high alkali resistance with a small number of steps. Furthermore, according to this production method, the ceramic particle protection material can be relatively easily allowed to be present on the surface of the honeycomb structure at a thickness (e.g., about 0.4 to about 1,000 nm) that cannot be achieved by the method in which a honeycomb structure is immersed in a solution containing an erosion-resistant material (e.g., slurry or sol). In the molding and firing step, during the firing of the molded body, another erosion-resistant material or a precursor thereof that is different from the erosion-resistant material or the precursor thereof contained in the molded body may be made to coexist and the ceramic particle protection material allowed to be present on the surface of the molded body may also be composed of the coexisting erosion-resistant material or the precursor thereof.

A method for producing a honeycomb structure according to another embodiment of the invention carries a catalyst component containing at least one element selected from the group consisting of alkali metals and alkaline earth metals and purifies (converts) exhaust emissions, the method including a starting material mixing step of mixing ceramic particles having a predetermined average particle size and fine particles being composed of the same material as the ceramic particles and having an average particle size smaller than the predetermined average particle size, to prepare a puddle; a molding and firing step of molding the puddle into a molded body and firing the molded body in the presence of an erosion-resistant material or a precursor thereof which inhibits the catalyst component from eroding the ceramic particles more effectively than an oxide of the element contained in the ceramic particles, to sinter the molded body and to allow a ceramic particle protection material composed of the erosion-resistant material or the precursor thereof to be present on the surface of the molded body; and a catalyst-carrying step of making the fired molded body to carry the catalyst component.

In the method of this embodiment, it is also more possible to allow the erosion-resistant material or the precursor thereof to be present on the surface of the honeycomb structure without carrying out a special step of allowing the erosion-resistant material or the precursor thereof to be present on the surface of the ceramic particles. Consequently, it is more possible to produce a honeycomb structure having high alkali resistance with a small number of steps.

In the methods of these embodiments, in the starting material mixing step, the ceramic particles include preferably at least one kind of particles selected from the group consisting of silicon carbide, silicon nitride, silica, alumina, zirconia, titania, ceria, and mullite. Among these, silicon carbide is more preferable. The reason for this is that silicon carbide has properties, such as thermal conductivity, desirable for use as a honeycomb structure that purifies(converts) exhaust emissions. In addition, silicon carbide easily reacts with the catalyst component, such as an alkali, and thus use of silicon carbide is significant to the present invention.

In the methods of these embodiments, in the starting material mixing step, silicon metal may be further mixed to prepare the puddle. Thereby, it is more possible to decrease the firing temperature because silicon metal binds ceramic particles at a lower temperature compared with the case where silicon metal is not added. In such a case, in the molding and firing step, the temperature for firing the molded body may be set at about 1,100° C. to about 1,800° C.

In the methods of these embodiments, when silicon metal is not added, in the molding and firing step, preferably, the firing temperature is set at 1,600° C. to 2,200° C. When the firing temperature of the molded body is about 1,600° C. or more, the strength of the honeycomb structure desirably can be increased. When the firing temperature of the molded body is about 2,200° C. or less, from the standpoint of thermal energy consumption, the environmental load is not easily undesirably increased.

In the methods of these embodiments, in the starting material mixing step, the predetermined average particle size is preferably in the range of about 5 to about 100 μm, and more preferably in the range of about 10 to about 50 μm. When the average particle size of the ceramic particles is about 5 μm or more, the pore size does not easily decrease, and pressure loss of exhaust emissions is not easily increased. When the average particle size is about 100 μm or less, the connection area between particles does not easily decrease, and strength is not easily undesirably decreased. Furthermore, in the starting material mixing step, the average particle size of the fine particles is preferably in the range of about 0.1 to about 10 μm, and more preferably in the range of about 0.1 to about 5 μm. When the average particle size of the fine particles is about 0.1 μm or more, the fine particles do not easily agglomerate and satisfactory disperse is realized, and uneven sintering does not easily occur. When the average particle size of the fine particles is about 10 μm or less, volumes of fine particles do not become excessively large and can be present easily in the connection area (neck area) between ceramic particles, and strength is not easily undesirably decreased.

In the methods of these embodiments, in the starting material mixing step, the erosion-resistant material preferably includes alumina. The reason for this is that, as crystals grow (recrystallization proceeds), alumina becomes more insoluble in acid or alkali. In such a case, examples of the "precursor of the erosion-resistant material" include aluminum oxycarbide, or the like. The "aluminum oxycarbide" is a compound represented by the general formula $Al_mO_nC$ (where m and n are each an integer), which contains Al, O, and C, for example, $Al_2OC$ or $Al_4O_4C$, or the like.

A method for producing a honeycomb structure according to another embodiment of the invention carries a catalyst component containing at least one element selected from the group consisting of alkali metals and alkaline earth metals and purifies(converts) exhaust emissions, the method including a starting material mixing step of mixing ceramic particles having a predetermined average particle size, fine particles being composed of the same material as the ceramic particles and having an average particle size smaller than the predetermined average particle size, and alumina or aluminum oxycarbide, to prepare a puddle; a molding and firing step of molding the puddle into a molded body and firing the molded body to sinter the molded body and to allow a ceramic particle protection material composed of the alumina or aluminum oxycarbide to be present on the surface of the molded body; and a catalyst-carrying step of making the fired molded body to carry the catalyst component.

In the method of this embodiment, by firing the molded body composed of the puddle obtained by mixing ceramic particles, fine particles composed of the same material as the ceramic particles, and alumina or aluminum oxycarbide, the molded body is sintered. By performing firing the molded body, a ceramic particle protection material composed of alumina or aluminum oxycarbide appears on the surface of the molded body. Therefore, it is not necessary to carry out a step of forming a ceramic particle protection material composed of alumina or aluminum oxycarbide on the surface of the molded body, separately from the step of firing the molded body. Furthermore, the honeycomb structure obtained by this production method of this embodiment can relatively easily inhibit the catalyst component from eroding the ceramic particles more effectively compared with a structure in which an oxide of the element contained in the ceramic particles forms a ceramic particle protection material. Consequently, it is more possible to produce a honeycomb structure having high alkali resistance with a small number of steps. Furthermore, according to this method of this embodiment, the ceramic particle protection material can be allowed to be relatively easily present on the surface of the honeycomb structure at a thickness (e.g., about 0.4 to about 1,000 nm) that cannot be achieved by the method in which a honeycomb structure is immersed in a solution containing alumina or aluminum oxycarbide (e.g., slurry or sol). Note that, as the starting material mixing step, the molding and firing step, and the catalyst-carrying step, the steps described above may be used.

A method for producing a honeycomb structure according to another embodiment of the invention carries a catalyst component containing at least one element selected from the group consisting of alkali metals and alkaline earth metals and purifies (converts) exhaust emissions, the method including a starting material mixing step of mixing ceramic particles having a predetermined average particle size and fine particles being composed of the same material as the ceramic particles and having an average particle size smaller than the predetermined average particle size, to prepare a puddle; a molding and firing step of molding the puddle into a molded body and firing the molded body in the presence of alumina or aluminum oxycarbide to sinter the molded body and to allow a ceramic particle protection material composed of the alumina or aluminum oxycarbide to be present on the surface of the molded body; and a catalyst-carrying step of making the fired molded body to carry the catalyst component.

In the method of this embodiment, it is also more possible to allow alumina or aluminum oxycarbide to be present on the surface of the honeycomb structure without carrying out a special step of allowing alumina or aluminum oxycarbide to be present on the surface of the ceramic particles. Consequently, it is more possible to produce a honeycomb structure having high alkali resistance with a small number of steps. Note that, as the starting material mixing step, the molding and firing step, and the catalyst-carrying step, the steps described above may be used.

A honeycomb structure according to one embodiment of the invention carries a catalyst component containing at least one element selected from the group consisting of alkali metals and alkaline earth metals and purifies (converts) exhaust emissions, the honeycomb structure including ceramic particles which serve as an aggregate, and a ceramic particle protection material being present on the surface of the ceramic particles and being composed of an erosion-resistant material or a precursor thereof which inhibits the catalyst component from eroding the ceramic particles more effectively than an oxide of the element contained in the ceramic particles, wherein the ceramic particle protection material is present on the surface of the ceramic particles at a thickness of about 0.4 to about 1,000 nm.

In the honeycomb structure of this embodiment, the ceramic particle protection material, which inhibits the catalyst component from eroding the ceramic particles more effectively than an oxide of the element contained in the ceramic particles, is present on the surface of the ceramic particles. Consequently, the honeycomb structure easily has high alkali resistance. In this case, the thickness of the ceramic particle protection material is preferably about 0.4 to about 1,000 nm, more preferably about 0.5 to about 5 nm, and most preferably about 0.6 to about 1.5 nm. When the thickness of the ceramic particle protection material is about 0.4 nm or more, it is easier to protect the ceramic particles sufficiently, which is desirable. When the thickness is about 1,000 nm or less, the pressure loss of exhaust gas passing through the honeycomb structure does not easily undesirably increase.

In the honeycomb structure of this embodiment, the ceramic particles include preferably at least one kind of particles selected from the group consisting of silicon carbide, silicon nitride, silica, alumina, zirconia, titania, ceria, and mullite. Among these, silicon carbide is more preferable. The reason for this is that silicon carbide has properties, such as thermal conductivity, desirable for use as a honeycomb structure that purifies (converts) exhaust emissions. In addition, silicon carbide easily reacts with the catalyst component, such as an alkali, and thus use of silicon carbide is significant to the present invention.

In the honeycomb structure of this embodiment, the ceramic particle protection material may be present as a protective layer on the surface of the ceramic particles. Thereby, since the ceramic particle protection material, as the protective layer, covers the surface of the ceramic particles, it is easy to prevent the ceramic particles from being eroded by the catalyst component.

In the honeycomb structure of this embodiment, the erosion-resistant material preferably includes alumina. The reason for this is that, as crystals grow, alumina becomes more insoluble in acid or alkali.

A honeycomb structure according to another embodiment of the invention carries a catalyst component containing at least one element selected from the group consisting of alkali metals and alkaline earth metals and purifies (converts) exhaust emissions, the honeycomb structure including ceramic particles which serve as an aggregate, and a ceramic particle protection material being present on the surface of the ceramic particles and being composed of alumina or aluminum oxycarbide, wherein the ceramic particle protection material is present on the surface of the ceramic particles at a thickness of about 0.4 to about 1,000 nm.

In the honeycomb structure of this embodiment, the ceramic particle protection material composed of alumina or aluminum oxycarbide, which inhibits the catalyst component from eroding the ceramic particles more effectively than an oxide of the element contained in the ceramic particles, is present on the surface of the ceramic particles. Consequently, the honeycomb structure easily has high alkali resistance. In this case, the thickness of the ceramic particle protection material is preferably about 0.4 to about 1,000 nm, more preferably about 0.5 to about 5 nm, and most preferably about 0.6 to about 1.5 nm. When the thickness of the ceramic particle protection material is about 0.4 nm or more, it is easier to protect the ceramic particles sufficiently, which is desirable. When the thickness is about 1,000 nm or less, the pressure loss of exhaust gas passing through the honeycomb structure does not easily undesirably increase. Note that, as the ceramic particles and ceramic particle protection material, those described above may be used.

An exhaust emission purification apparatus according to one embodiment of the invention removes particulate matter contained in exhaust emissions from an internal combustion engine, the exhaust emission purification apparatus including a connecting pipe which is connected to the internal combustion engine and through which exhaust emissions from the internal combustion engine pass, and a honeycomb structure container which is connected to the connecting pipe and which contains any of the honeycomb structures described above.

In the exhaust emission purification apparatus of this embodiment, since the honeycomb structure having increased alkali resistance according to embodiments of the present invention is used, the honeycomb structure does not easily degrade, and time and labor for maintenance can be saved.

In the honeycomb structure obtained by the method according to any of the embodiments described above, since alumina as an erosion-resistant material is present on the surface of silicon carbide particles, even if an alkali metal or an alkaline earth metal is carried on the surface of the honeycomb structure, silicon carbide, which is an aggregate, is not easily eroded. Although not clear at present, the reason for the presence of alumina on the surface is thought to be as follows. That is, in the raw molded body before firing, fine-grained silicon carbide and alumina are included between particles of coarse-grained silicon carbide. During firing at high temperatures, alumina together with the fine-grained silicon carbide is dispersed toward the surface of the coarse-grained silicon carbide. At this stage, alumina reacts with carbon or the like, and a precursor of alumna, such as aluminum oxycarbide ($Al_2OC$, $Al_4O_4C$, or the like), is also formed on the surface of the coarse-grained silicon carbide. It is assumed that a protective layer composed of alumina and the precursor thereof is formed on the surface of the coarse-grained silicon carbide in such a manner. Since the protective layer is formed at a high temperature of about 1,600° C. or more, crystallization proceeds, and the resulting layer has high alkali resistance. Consequently, it is assumed that, even if an alkali metal or an alkaline earth metal as a catalyst component is carried, silicon carbide as an aggregate is not easily eroded. The precursor of alumina is also assumed to have high resistance to alkali. Furthermore, even if the precursor of alumina is oxidized into alumina during use of the honeycomb structure, or the like, alkali resistance is believed to be unchanged.

In the method according to any of the embodiments described above, in the production process of the honeycomb structure, simultaneously with firing of the molded body, alumina or the precursor thereof, as the erosion-resistant material, appears on the surface of the molded body. Therefore, it is not necessary to carry out a step of forming alumina as the erosion-resistant material on the surface of the molded body, separately from the step of firing the molded body. Furthermore, the honeycomb structure obtained by this production method can relatively easily inhibit the catalyst component from eroding silicon carbide more effectively compared with the case where silica serves as a protective material. Consequently, the honeycomb structure having high alkali resistance can be relatively easily produced with a small number of steps. In the method according to any of the embodiments described above, it is possible to form a protective layer composed of alumina on the surface of the honeycomb structure at a thickness (e.g., about 0.4 to about 1,000 nm) that cannot be achieved by the method in which a honeycomb structure is immersed in a solution containing alumina (e.g., slurry or sol). Furthermore, the honeycomb structure obtained by the production method according to any of the embodiments described above has high alkali resistance.

In this description, the average particle size was determined by a laser diffraction scattering method using a Mastersizer Micro manufactured by MALVERN Instruments Ltd.

Best modes for carrying out the present invention will now be described below in detail.

First, a honeycomb structure according to an embodiment of the present invention will be described. FIG. 1 is a schematic diagram showing a honeycomb structure 10 according to the embodiment. The honeycomb structure 10 is a catalyst carrier which carries a catalyst that occludes NOx contained in exhaust emissions to perform conversion. The honeycomb structure 10 is fabricated by joining a plurality of honeycomb units 11 to one another with a sealing material layer, each honeycomb unit 11 having a rectangular pillar shape and having a plurality of through-holes 12 arranged in parallel in the longitudinal direction, and forming the resulting structure into a cylindrical shape. The honeycomb structure 10 has outer dimensions of a diameter of 143.8 mm and a length of 150 mm. Each honeycomb unit 11 has outside dimensions of 34.3 mm×34.3 mm×150 mm. The thickness of a partition wall 15 between the adjacent through-holes 12 is set in the range of about 0.05 to about 0.35 mm (more preferably in the range of about 0.10 to about 0.30 mm), and the number of through-holes per unit area is set at about 15.5 to about 186 cells/cm$^2$ (about 100 to about 1,200 cpsi). Each of the through-hole 12 may have, for example, a substantially triangular or substantially hexagonal cross-sectional shape. In this example, each of the through-holes 12 has a square cross-sectional shape. A coat layer 13 which serves as a catalyst carrier is disposed inside each of the through-holes 12.

The honeycomb structure 10 contains silicon carbide as ceramic particles serving as an aggregate and an alumina as a non-reducing material. Examples of the alumina include alumina and a precursor of alumina (e.g., $Al_2OC$ or $Al_4O_4C$). The amount of silicon carbide contained in the honeycomb structure 10 is in the range of about 80% to about 98% by weight, and the amount of alumina is in the range of about 2% to about 20% by weight (more preferably in the range of about 3% to about 10% by weight). A protective layer containing alumina and a precursor thereof is formed on the surface of the silicon carbide particles of the honeycomb structure 10. The protective layer is present on the surface of the silicon carbide particles at a thickness in the range of about 0.4 to about 1,000 nm (more preferably in the range of about 0.5 to about 5 nm, and most preferably in the range of about 0.6 to about 1.5 nm). The alumina and the precursor thereof are treated at a high temperature of about 1,600° C. or more, and thus easily have higher alkali resistance than the oxide of Si (silica) contained in silicon carbide.

Furthermore, the honeycomb structure 10 carries, as catalyst components, platinum which is a noble metal, potassium and barium which are NOx occlusion catalysts, and the like. The coat layer 13 is formed on the surface of the wall of each of the through-holes by wash-coating alumina as a catalyst carrier. The catalyst components are impregnated into and carried by the coat layer 13. The honeycomb structure 10 occludes NOx contained in exhaust emissions and converts exhaust emissions by means of the catalyst components.

Figure 2:
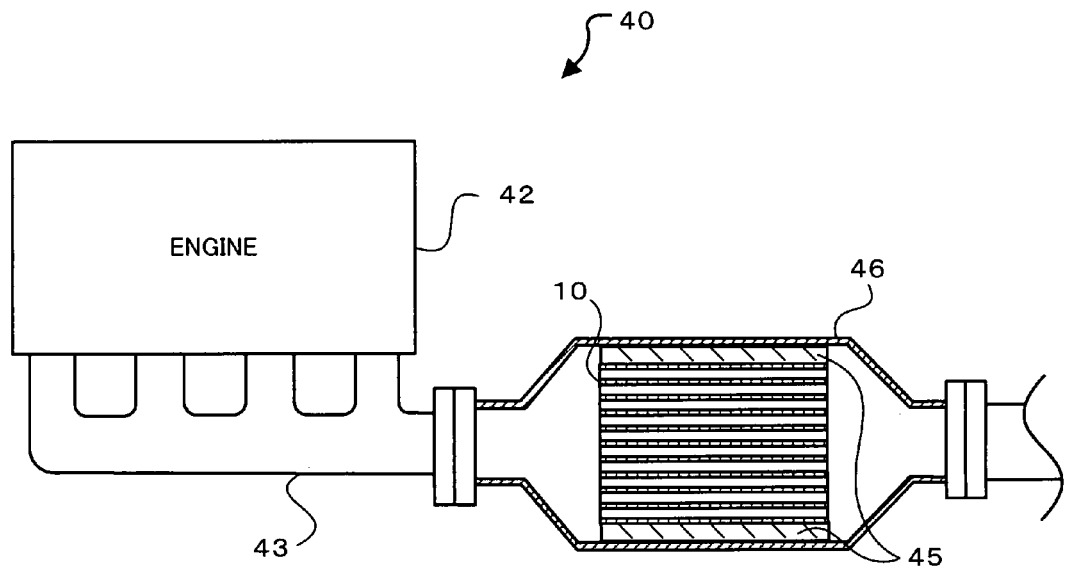
FIG. 2 is a schematic diagram showing an exhaust emission purification (conversion) apparatus 40 according to an embodiment of the present invention.

Next, an exhaust emission purification(conversion) apparatus 40 including the honeycomb structure 10 will be described. FIG. 2 is a schematic diagram showing the exhaust emission purification(conversion) apparatus 40 according to an embodiment of the present invention. The exhaust emission purification apparatus 40 includes an engine 42, a manifold 43 connected to the engine 42, a casing 46 (corresponding to a honeycomb structure container of the present invention) connected to the manifold 43, and the honeycomb structure 10 which carries the catalyst components and which is held in the casing 46 with an alumina mat 45 therebetween. The exhaust emission purification(conversion) apparatus 40 is mounted in an automobile. Exhaust emissions from the engine 42 contain oxides of nitrogen (NOx), hydrocarbon (HC), and carbon monoxide (CO). The honeycomb structure 10 is fixed in the casing 46 composed of a metal with the alumina mat 45 being wound around the outer circumference thereof.

Next, the operation of the exhaust emission purification (conversion) apparatus 40 will be described. When the engine 42 starts, exhaust emissions containing NOx are discharged from the engine 42 through the manifold 43 to an exhaust pipe 44. When exhaust emissions pass through the through-holes 12 of the honeycomb structure 10, the exhaust emissions are converted by the catalyst components carried by the walls of the through-holes 12. Specifically, at a lean air-fuel ratio, NOx contained in exhaust emissions is occluded by the NOx occlusion catalysts (potassium and barium). On the other hand, at a rich air-fuel ratio, by means of occluded NOx, platinum as an oxidation catalyst converts NOx, HC, and CO into nitrogen ($N_2$), water ($H_2O$), and carbon dioxide ($CO_2$). At this time, although the temperature of the honeycomb structure 10 is increased due to heat of the exhaust emissions, since the protective layer composed of alumina and the precursor thereof is formed on the surface of the silicon carbide, the silicon carbide of the honeycomb structure 10 is not easily eroded by the alkali metal and the alkaline earth metal which are carried.

Next, each step of a method for producing the honeycomb structure 10 will be described. The method for producing the honeycomb structure described here uses silicon carbide as ceramic particles (hereinafter referred to as "coarse-grained silicon carbide"), silicon carbide being composed of the same material as the ceramic particles and having an average particle size smaller than that of the ceramic particles as fine particles (hereinafter referred to as "fine-grained silicon carbide"), and alumina as an erosion-resistant material.

(1) Starting Material Mixing Step

Coarse-grained silicon carbide to be used, which is a starting material for the honeycomb structure 10, has an average particle size in the range of about 5 to about 100 μm (preferably about 30 to about 40 μm). Fine-grained silicon carbide to be used has an average particle size in the range of about 0.1 to about 10 μm. Alumina to be used has an average particle size in the range of about 0.1 to about 10 μm. Note that alumina has high stability at high temperatures, functions as an erosion-resistant material effectively, and can accelerate sintering of silicon carbide. With respect to the mixing ratio of the starting materials, preferably, the amount of coarse-grained silicon carbide is about 50% to about 70% by weight, the amount of fine-grained silicon carbide is about 20% to about 35% by weight (in particular, about 25% to about 30% by weight), and the amount of alumina is about 0.1% to about 30% by weight (in particular, about 0.1% to about 5% by weight), relative to the total amount of coarse-grained silicon carbide, fine-grained silicon carbide, and alumina. When the amount of coarse-grained silicon carbide is about 50% by weight or more, the amounts of fine-grained silicon carbide and alumina do not increase relatively, and the pore size of the honeycomb structure does not undesirably decrease. When the amount is about 70% by weight or less, the amounts of fine-grained silicon carbide and alumina do not decrease relatively, and strength is not easily undesirably decreased. Furthermore, when the amount of fine-grained silicon carbide is about 20% by weight or more, the amount of the material that forms the connection area (neck area) between particles of coarse-grained silicon carbide does not excessively decreases, and thermal conductivity and thermal shock resistance do not undesirably decrease. When the amount is about 35% by weight or less, the pore size of the honeycomb structure does not undesirably decreases. Furthermore, when the amount of alumina is about 0.1% by weight or more, the aluminum component can be easily present on the surface, which is desirable. When the amount is about 30% by weight or less, the amount of the aluminum component present in the neck area does not increases, and thermal conductivity, thermal shock resistance, and high-temperature bending strength do not undesirably decrease.

Subsequently, about 10 to about 30 parts by weight of water is added to 100 parts by weight of a mixture of the coarse-grained silicon carbide, fine-grained silicon carbide, and alumina described above, followed by wet mixing to prepare a puddle. As the dispersion medium, in addition to water, for example, an organic solvent (benzene or the like) or an alcohol (methanol or the like) may be used. Additionally, an organic binder and a molding aid may be appropriately added to the puddle in view of moldability. Examples of the organic binder include methyl cellulose, carboxymethyl cellulose, hydroxyethyl cellulose, and polyethylene glycol. These may be used alone or in a combination of two or more. The amount of the organic binder used is preferably about 1 to about 10 parts by weight relative to 100 parts by weight of the total amount of coarse-grained silicon carbide, fine-grained silicon carbide, and alumina. Examples of the molding aid include ethylene glycol, dextrin, fatty acid, fatty acid soaps, and polyalcohols. The puddle may be mixed, for example, using, a mixer, an attritor, or the like, or may be kneaded thoroughly using a kneader or the like.

(2) Molding and Firing Step

Next, the puddle containing coarse-grained silicon carbide, fine-grained silicon carbide, and alumina prepared in the starting material mixing step is molded into a honeycomb shape. As the method for molding the puddle, extrusion, slip casting, pressing, or the like is used. Since fine-grained silicon carbide is added to the puddle, the fine-grained silicon enters between particles of coarse-grained silicon carbide during the molding procedure. The shape of the honeycomb structure to be formed may be selected appropriately, depending on the intended use or the like. Any shape or size may be selected, and for example, the shape may be cylindrical, rectangular-pillar, or cylindroid. Herein, a rectangular-pillar honeycomb unit 11 in which a plurality of the through-holes 12 are arranged in parallel in the longitudinal direction is formed. The size of the through-holes 12, the number of through-holes 12, and the thickness of a partition wall 13 between the adjacent through-holes 12 may be selected appropriately, depending on the purpose of intended use. The sectional shape of each of the through-holes may be rectangular, triangular, or hexagonal.

The resulting raw molded body is dried and fired. Drying is performed at a temperature of about 100° C. to about 200° C. using a microwave dryer, a hot-air dryer, or the like. When an organic component, such as an organic binder, is added in the starting material mixing step, it is preferable to perform calcination before firing, in order to degrease the organic component. The calcination conditions are appropriately selected depending on the amount and kind of the organic component added. For example, the calcination is performed by heating at about 300° C. to about 650° C. in an oxygen atmosphere. Firing of the molded body is carried out, for example, under the following conditions: in an inert gas atmosphere, such as nitrogen or argon, at about 1,600° C. to about 2,200° C., more preferably at about 1,900° C. to about 2,100° C. Herein, since alumina is used as an erosion-resistant material, it is more possible to decrease the firing temperature by about 100° C. to about 300° C. as compared with the case where alumina is not added. By means of the firing, a ceramic particle protection material composed of alumina or a precursor thereof, which is an erosion-resistant material, appears on the surface of the molded body. The ceramic particle protection material appears at a thickness (e.g., about 0.4 to about 1,000 nm) that cannot be achieved by the method in which a molded body is immersed in a solution containing an erosion-resistant material (e.g., slurry or sol). Thereby, the honeycomb unit (sintered molded body) 11 is obtained.

Subsequently, a sealing material paste is applied to the outer surface of each honeycomb unit 11, where the through-holes 12 are not open, and a plurality of honeycomb units 11 are joined. Drying and solidification are performed at about 120° C. to form a sealing material layer 16. The resulting joined product is cut into a cylindrical shape with a diamond cutter or the like. The outer circumferential surface thereof, in which the through-holes 12 are not open, is coated with a paste similar to the sealing material paste. Drying and solidification are performed at about 120° C. to form a coating material layer 17. A honeycomb carrier (which is a honeycomb structure before it has been made to carry a catalyst component) is thereby obtained. Herein, the sealing material paste contains at least one of inorganic fibers and inorganic particles and appropriately contains an inorganic binder or an organic binder. Examples of the inorganic fibers include at least one kind of ceramic fibers selected from silica-alumina, mullite, alumina, silica, and the like. Examples of the inorganic particles include at least one kind of particles selected from silicon carbide, silicon nitride, boron nitride, and the like. Examples of the inorganic binder include at least one kind of binders selected from silica sol, alumina sol, and the like. Examples of the organic binder include at least one kind of binders selected from polyvinyl alcohol, methyl cellulose, ethyl cellulose, carboxymethyl cellulose, and the like.

(3) Catalyst-Carrying Step

Subsequently, catalyst components are carried on the resulting honeycomb carrier. Herein, platinum, potassium, and barium are carried. The carrying of the catalyst components is performed, for example, by providing a coat layer 13 which has been wash-coated with alumina as a catalyst carrier on the surface of the partition wall 15, and the coat layer 13 is impregnated with the catalyst components. The honeycomb structure may be made to directly carry the catalyst components. First, a slurry for the coat layer is prepared. The honeycomb structure 10 is immersed in the slurry, and then the honeycomb structure 10 is pulled out. The extra slurry remaining in the through-holes 12, etc. is removed by suction. Drying is performed at about 80° C. to about 200° C., and firing is performed at about 500° C. to about 700° C. to form the coat layer 13. After that, the honeycomb carrier is immersed in a solution containing a catalyst component, followed by drying, and firing is performed at about 500° C. to about 700° C. This step is repeated for each catalyst component. Thereby, the honeycomb structure 10 carrying platinum, potassium, and barium is obtained. The amounts of the catalyst components to be carried may be selected appropriately according to the purpose of intended use. Herein, the coat layer 13 is formed such that the amount per unit volume of alumina as the catalyst carrier is about 50 to about 120 g/L. The amounts of catalyst components carried per volume of the honeycomb structure 10 are set such that the amount of platinum is about 0.1 to about 8.0 g/L and the total amount of potassium and barium is about 0.25 to about 0.45 mol/L. The ratio between potassium and barium may be set appropriately.

Figure 3:
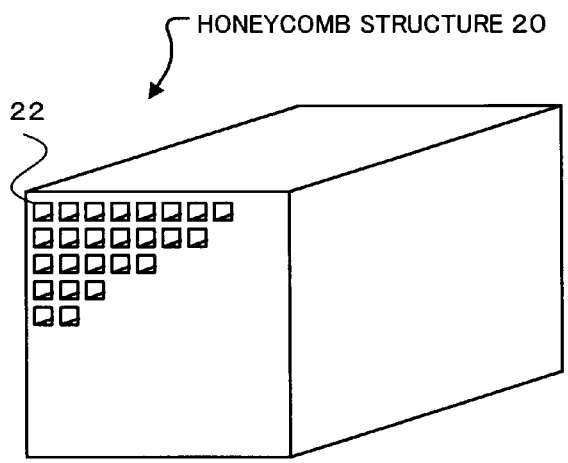
FIG. 3 is a schematic diagram showing a honeycomb structure 20 according to an embodiment of the present invention.
Figure 4:
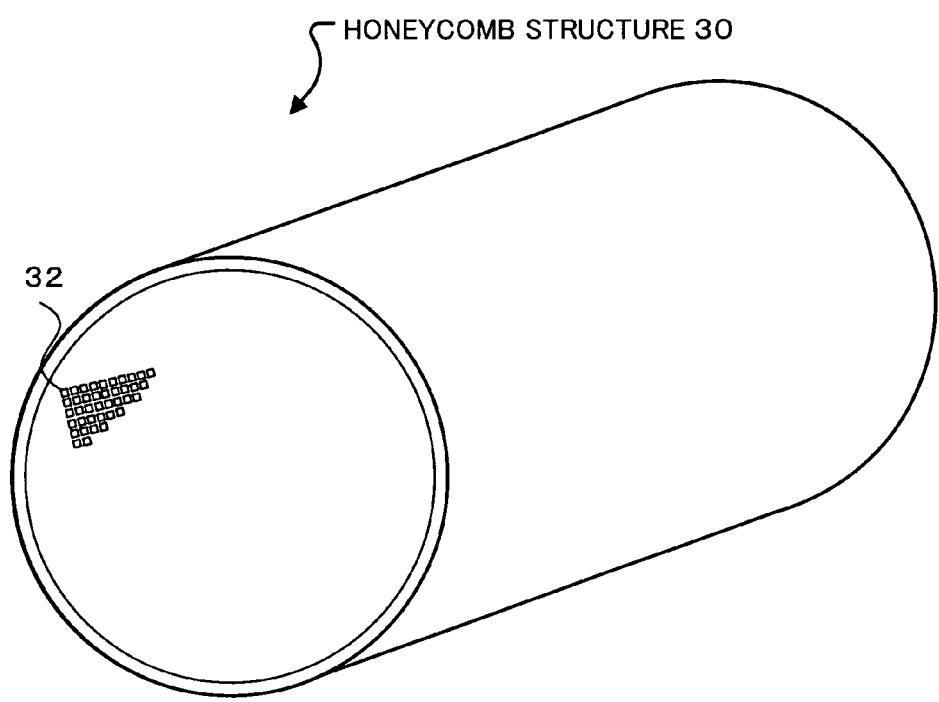
FIG. 4 is a schematic diagram showing a honeycomb structure 30 according to an embodiment of the present invention.

As shown in FIG. 3, a honeycomb structure 20 may be produced by a method in which a honeycomb unit 11 provided with through-holes 22 is used as a honeycomb carrier, and the honeycomb carrier is made to carry catalyst components. Furthermore, as shown in FIG. 4, a honeycomb structure 30 may be produced by a method in which a cylindrical molded body with through-holes 32 is formed by integral molding, followed by firing to form a honeycomb carrier, and the honeycomb carrier is made to carry catalyst components. Furthermore, in any of the honeycomb structures 10 to 30, by alternately plugging end faces of through-holes with a paste having the same composition as that of the puddle described above, a diesel particulate filter (hereinafter referred to as DPF) which removes particulate matter (hereinafter referred to as PM) from exhaust emissions of a diesel engine or the like may be produced. Specifically, with respect to a plurality of through-holes, through-holes having a first plugged end face and a second open end face and through-holes having a first open end face and a second plugged end face are alternately arranged.

It is to be understood that the present invention is not limited to the embodiments described above, and various embodiments within the scope of the technical field of the present invention can be carried out.

For example, in the embodiments described above, alumina is present as a protective layer on the surface of silicon carbide particles. However, the surface may have portions not covered with alumina. Even in such a case, alkali resistance improves at least in portions in which alumina is present.

In the molding and firing step, when a raw molded body is fired in the absence of oxygen, another alumina that is different from the alumina contained in the molded body may be made to coexist, and thus alumina is allowed to be present on the surface of silicon carbide of the honeycomb structure 10. Alumina is made to coexist preferably under the conditions that the amount of alumina is about 80 to about 400 parts by weight relative to 1,500 parts by weight of the honeycomb structure. As the method for making alumina to coexist, a method in which alumina powder is placed on a tray composed of carbon or the like, or a method in which alumina powder is packed inside the through-holes of the honeycomb structure is used. In the starting material mixing step described above, alumina is mixed for molding. However, a starting material mixing step in which coarse-grained silicon carbide and fine-grained silicon carbide are mixed without mixing alumina may be carried out, and in the molding and firing step, firing may be performed in the presence of alumina to allow alumina to be present on the surface of ceramic particles of the honeycomb structure 10.

In the starting material mixing step, the mixture includes coarse-grained silicon carbide, fine-grained silicon carbide, and alumina. However, silicon metal may be further mixed thereto. Thereby, it is more possible to decrease the firing temperature of silicon carbide. In such a case, with respect to the mixing ratio of starting materials, the amount of coarse-grained silicon carbide is preferably about 50% to about 70% by weight, the amount of fine-grained silicon carbide is preferably about 5% to about 35% by weight (more preferably about 10% to about 30% by weight), the amount of metal silicon is preferably about 5% to about 35% by weight (more preferably about 10% to about 30% by weight), and the amount of alumina is about 1% to about 30% by weight (more preferably about 3% to about 7% by weight), relative to the total amount of coarse-grained silicon carbide, fine-grained silicon carbide, metal silicon, and alumina. In such a case, in the molding and firing step, the molded body can be sintered at a firing temperature of about 1,100° C. to about 1,800° C.

EXAMPLES

Examples will be described below, in which honeycomb structures 20 were specifically produced.

Example 1

First, 6,750 parts by weight of α-silicon carbide powder (average particle size: 40 μm) as ceramic particles, 2,950 parts by weight of α-silicon carbide powder (average particle size: 0.5 μm) as fine particles, 300 parts by weight of γ-alumina (average particle size: 0.5 μm) as an erosion-resistant material, and 1,800 parts by weight of water were mixed, and 600 parts by weight of methyl cellulose as an organic binder, 150 parts by weight of glycerol as a plasticizer, and 330 parts by weight of a lubricant (trade name: UNILUB; manufactured by NOF Corporation) were further added to the mixture, followed by kneading to obtain a puddle. The puddle was extruded with an extruder into a rectangular-pillar shape in which a plurality of through-holes are arranged in parallel in the longitudinal direction, each though-hole having a square cross-section. Thereby, a raw molded body was obtained. The resulting raw molded body was dried with a microwave dryer, and then fired at ordinary pressure under an argon atmosphere at 2,000° C., for 3 hours to form a rectangular-pillar honeycomb structure composed of a silicon carbide sintered body having dimensions of 34.3 mm×34.3 mm×150 mm, 31 through-holes/cm² (200 cpsi), and partition walls with a thickness of 0.3 mm.

Next, catalyst components were the resulting honeycomb carrier. First, 84 parts by weight of alumina powder (average particle size: 0.5 μm) and 200 parts by weight of water were mixed with a ball mill for 24 hours, and then the mixture was diluted to twice its volume with ion-exchanged water to prepare a slurry of alumina for forming a coat layer as a carrier of catalyst components. The honeycomb structure was immersed in the slurry, and the extra slurry was removed by suction. Drying was performed at 120° C. for 2 hours, and firing was performed at 500° C. for 2 hours. Subsequently, the honeycomb carrier was immersed in a solution of platinum sulfate, and the weight of platinum per unit volume of the honeycomb carrier was adjusted to 5 g/L to perform carrying of the catalyst component. Firing was performed at 500° C. for one hour. Then, the honeycomb carrier was immersed in an aqueous solution of $KNO_3$, and the amount of potassium per unit volume of the honeycomb carrier was adjusted to 0.3 mol/L to perform carrying of the catalyst component. Furthermore, separately from the honeycomb carrier made to carry potassium, a honeycomb carrier made to carry platinum was immersed in an aqueous solution of $Ba(NO_3)_2$, and the amount of barium per unit volume of the honeycomb carrier was adjusted to 0.3 mol/L to perform carrying of the catalyst component. These samples were held at 500° C. for one hour, and honeycomb structures 20 carrying the catalyst components shown in FIG. 3 were obtained. Table 1 shows the summary of the numerical values, such as the average particle size of the starting materials, i.e., the average particle size of coarse-grained silicon carbide, the average particle size of fine-grained silicon carbide, and the average particle size of alumina, the mixing ratio of coarse particles, the mixing ratio of fine particles, the mixing ratio of alumina, and the firing temperature, with respect to the honeycomb structure 20 in Example 1. Table 1 also shows the summary regarding Examples 2 to 9, which will be described below. Furthermore, the three-point bending strength, average pore size, thickness of the alumina layer, and presence or absence of erosion by $KNO_3$ and $Ba(NO_3)_2$, which will be described below, are also shown in Table 1.

TABLE 1

| Sample | [1)]Coarse Grain Particle Size μm | [2)]Fine Grain Particle Size μm | Alumina Particle Size μm | Coarse Grain Mixing Ratio % by weight | Fine Grain Mixing Ratio % by weight | Alumina Mixing Ratio % by weight |
|---|---|---|---|---|---|---|
| Example 1 | 40 | 0.5 | 0.5 | 67.5 | 29.5 | 3.0 |
| Example 2 | 40 | 0.5 | 0.5 | 66.5 | 28.5 | 5.0 |
| Example 3 | 40 | 0.5 | 0.5 | 65.5 | 27.5 | 7.0 |
| Example 4 | 30 | 0.5 | 0.5 | 66.5 | 28.5 | 5.0 |
| Example 5 | 30 | 0.5 | 0.5 | 65.5 | 27.5 | 7.0 |
| Example 6 | 40 | 0.5 | 0.5 | 68.5 | 30.5 | 1.0 |
| Example 7 | 40 | 0.5 | 0.5 | 66.5 | 28.5 | 5.0 |
| Example 8 | 40 | 0.5 | — | 70.0 | 30.0 | — |
| Example 9 | 40 | — | 0.5 | 95.0 | — | 5.0 |

| Sample | Firing Temperature ° C. | Three-point Bending Strength MPa | Average Pore Diameter μm | Thickness of Alumina Layer nm | Presence of Erosion by $KNO_3$ | Presence of Erosion by $Ba(NO_3)_2$ |
|---|---|---|---|---|---|---|
| Example 1 | 2000 | 23.6 | 25.9 | 0.6 | NO | NO |
| Example 2 | 2000 | 26.7 | 26.2 | 0.8 | NO | NO |
| Example 3 | 2000 | 25.3 | 25.4 | 1.5 | NO | NO |
| Example 4 | 2000 | 26.1 | 23.5 | 0.9 | NO | NO |
| Example 5 | 2000 | 26.3 | 23.9 | 1.4 | NO | NO |
| Example 6 | 2000 | 9.1 | 25.3 | 0.4 | NO | NO |
| Example 7 | 1600 | 7.8 | 23.4 | 0.4 | NO | NO |
| Example 8 | 2000 | 7.1 | 25.6 | — | YES | YES |
| Example 9 | 2000 | 8.4 | 26.1 | 0.3 | YES | YES |

[1)]Coarse Grain: Ceramic Particle:Silicon Carbide
[2)]Fine Grain: Fine Particle:Silicon Carbide Examples 2 to 9

Honeycomb structures 20 were produced as in Example 1 except that the honeycomb structures were designed so as to have the mixing ratios and the firing temperatures shown in Table 1. In Example 7, the mixing ratios were the same as those in Example 2 and the firing temperature was set at 1,600° C. In Example 8, alumina, i.e., a ceramic particle protection material, was not added. In Example 9, fine particles of silicon carbide were not added.

Example 10

A honeycomb structure was designed so as to have the same mixing ratios and shape as those in Example 2. Alumina was placed in a carbon tray such that 100 g of alumina coexisted relative to 10 honeycomb carriers, and honeycomb carriers were produced by firing raw molded bodies at 2,000° C. in an argon atmosphere. The honeycomb carriers were made to carry the catalyst components as in Example 1, and thereby honeycomb structures 20 were obtained. Table 2 shows the summary of the numerical values, such as the average particle size of starting materials, i.e., the average particle size of coarse-grained silicon carbide, the average particle size of fine-grained silicon carbide, and the average particle size of alumina, the mixing ratio of coarse particles, the mixing ratio of fine particles, the mixing ratio of alumina, the firing temperature, and the amount of coexisting alumina with respect to the honeycomb structures 20 in Example 10. Note that the mixing ratios are in terms of percent by weight relative to the total amount of coarse-grained silicon carbide, fine-grained silicon carbide, and alumina. Table 2 also shows the data regarding Examples 11 to 16, which will be described below. Furthermore, the three-point bending strength, average pore size, thickness of the alumina layer, and presence or absence of erosion by KNO$_3$ and Ba(NO$_3$)$_2$, which will be described below, are also shown in Table 2.

rials, i.e., the average particle size of coarse-grained silicon carbide, the average particle size of fine-grained silicon carbide, and the average particle size of alumina, the mixing ratio of coarse particles, the mixing ratio of fine particles, the mixing ratio of alumina, the mixing ratio of metal silicon, and the firing temperature. Furthermore, the three-point bending

TABLE 2

| Sample | 1)Coarse Grain Particle Size μm | 2)Fine Grain Particle Size μm | Alumina Particle Size μm | Coarse Grain Mixing Ratio % by weight | Fine Grain Mixing Ratio % by weight | Alumina Mixing Ratio % by weight | Metal Silicon Mixing Ratio % by weight | Firing Temperature °C. |
|---|---|---|---|---|---|---|---|---|
| Example 2 | 40 | 0.5 | 0.5 | 66.5 | 28.5 | 5.0 | | 2000 |
| Example 10 | 40 | 0.5 | 0.5 | 66.5 | 28.5 | 5.0 | | 2000 |
| Example 11 | 40 | 0.5 | 0.5 | 66.5 | 28.5 | 5.0 | | 2000 |
| Example 12 | 40 | 0.5 | 0.5 | 66.5 | 28.5 | 5.0 | | 2000 |
| Example 13 | 40 | 0.5 | 0.5 | 66.5 | 28.5 | 5.0 | | 2000 |
| Example 14 | 40 | 0.5 | — | 70.0 | 30.0 | — | | 2000 |
| Example 15 | 40 | — | 0.5 | 95.5 | — | 5.0 | | 2000 |
| Example 16 | 40 | 0.5 | 0.5 | 66.5 | 20.0 | 5.0 | 8.5 | 1450 |

| Sample | 3)Amount of Coexisting Alumina g | Three-point Bending Strength MPa | Average Pore Diameter μm | Thickness of Alumina Layer nm | Presence of Erosion by KNO$_3$ | Presence of Erosion by Ba(NO$_3$)$_2$ |
|---|---|---|---|---|---|---|
| Example 2 | 0 | 26.7 | 26.2 | 0.8 | NO | NO |
| Example 10 | 100 | 23.6 | 25.9 | 1.8 | NO | NO |
| Example 11 | 200 | 26.7 | 26.2 | 2.2 | NO | NO |
| Example 12 | 300 | 25.3 | 25.4 | 2.8 | NO | NO |
| Example 13 | 400 | 26.1 | 23.5 | 3.4 | NO | NO |
| Example 14 | 200 | 7.1 | 25.8 | 0.8 | NO | NO |
| Example 15 | 0 | 8.4 | 26.1 | 0.3 | YES | YES |
| Example 16 | 100 | 15.3 | 24.3 | 1.8 | NO | NO |

1)Coarse Grain: Ceramic Particle:Silicon Carbide
2)Fine Grain: Fine Particle:Silicon Carbide
3)Amount of alumina allowed to coexist with respect to 10 honeycomb structures (34 × 34 × 150 cm) inside a firing furnace Examples 11 to 15

Honeycomb structures 20 were produced as in Example 10 except that the honeycomb structures were designed so as to have the mixing ratios and the firing temperatures shown in Table 2. In Example 15, fine particles of silicon carbide were not added.

Example 16

First, 6,650 parts by weight of α-silicon carbide powder (average particle size: 40 μm) as ceramic particles, 2,000 parts by weight of α-silicon carbide powder (average particle size: 0.5 μm) as fine particles, 850 parts by weight of metal silicon (average particle size: 4 μm), 500 parts by weight of γ-alumina (average particle size: 0.5 μm) as a ceramic particle protection material, and 2,400 parts by weight of water were mixed, and 600 parts by weight of methyl cellulose as an organic binder, 100 parts by weight of glycerol as a plasticizer, and 150 parts by weight of a lubricant (trade name: UNILUB; manufactured by NOF Corporation) were further added to the mixture, followed by kneading to obtain a puddle. The puddle was molded as in Example 1. Alumina was placed in a carbon tray such that 200 g of alumina coexisted relative to 10 honeycomb carriers and, raw molded bodies were fired at 1,450° C. under an argon atmosphere. Thereby, honeycomb carriers having the same shape as that in Example 1 were formed. The resulting carriers were made to carry KNO$_3$ or Ba(NO$_3$)$_2$ in the same manner as that described above. Table 2 shows the summary of the numerical values, such as the average particle size of the starting matestrength, average pore size, thickness of the alumina layer, and presence or absence of erosion by KNO$_3$ and Ba(NO$_3$)$_2$, which will be describe below, are also shown in Table 2.

[Measurement of Particle Size Distribution]

With respect to the starting material powders used in Examples 1 to 16, particle size distribution was measured. The measurement was carried out by a laser diffraction scattering method using a Mastersizer Micro manufactured by MALVERN Instruments Ltd. as a measuring device.

[Three-Point Bending Strength]

With respect to Examples 1 to 16, three-point bending strength was measured. The measurement was carried out according to JIS-R1601 using an Instron 5582 as a measuring apparatus. Specifically, at a crosshead speed of 0.5 mm/min and with a span of 125, breaking load was measured by applying a load perpendicular to the through-holes 12 of the rectangular-pillar honeycomb structure 20 shown in FIG. 3, and the geometrical moment of inertia was calculated from the wall thickness, the structure of the honeycomb, etc. to determine the strength. The contents of JIS-R1601 are incorporated herein by reference.

[Measurement of Average Pore Size]

With respect to Examples 1 to 16, the average pore size was measured. The measurement was carried out by a mercury press-in method according to JIS-R1655 using an automated porosimeter AutoPore III 9405 manufactured by Shimadzu Corporation as a measuring apparatus. Specifically, the honeycomb structure 20 was cut into a cube with edges of about 0.8 cm, and the cube was subjected to supersonic cleaning with ion-exchanged water, followed by drying. Then, measurement was carried out using the measuring device described above in a measurement range of 0.2 to 500 μm. The measurement was carried out every 0.1 psia in a range of 100 to 500 μm, and every 0.25 psia in a range of 0.2 to 100 μm. The contents of JIS-R1655 are incorporated herein by reference.

[Measurement of Thickness of Alumina Layer]

With respect to Examples 1 to 16, the thickness of the alumina layer was measured. The measurement was carried out by an etching method using a PHI-700 Auger electron spectroscopy analyzer manufactured by ULVAC-PHI, Inc. as a measuring apparatus. Using a half-power bandwidth method, the thickness was determined when the detection intensity of oxygen halved.

[Alkali Resistance Test]

With respect to Examples 1 to 16, a resistance test for $KNO_3$ or $Ba(NO_3)_2$ was performed. The test was performed under the conditions that the samples of Examples 1 to 16 were maintained in an oxygen atmosphere at 1,200° C. for 50 hours to promote erosion of silicon carbide by an alkali, such as $KNO_3$ or $Ba(NO_3)_2$, which was carried on the samples, and the surface of each sample was visually observed to perform evaluation.

[TEM Observation]

With respect to Example 2, TEM observation was performed. TEM was carried out using a HF-2000 manufactured by Hitachi, Ltd. Elemental analysis was also performed at arbitrary points observed. The elemental analysis was performed using an energy dispersive X-ray spectroscope (EDS).

[Experimental Results]

Figure 5:
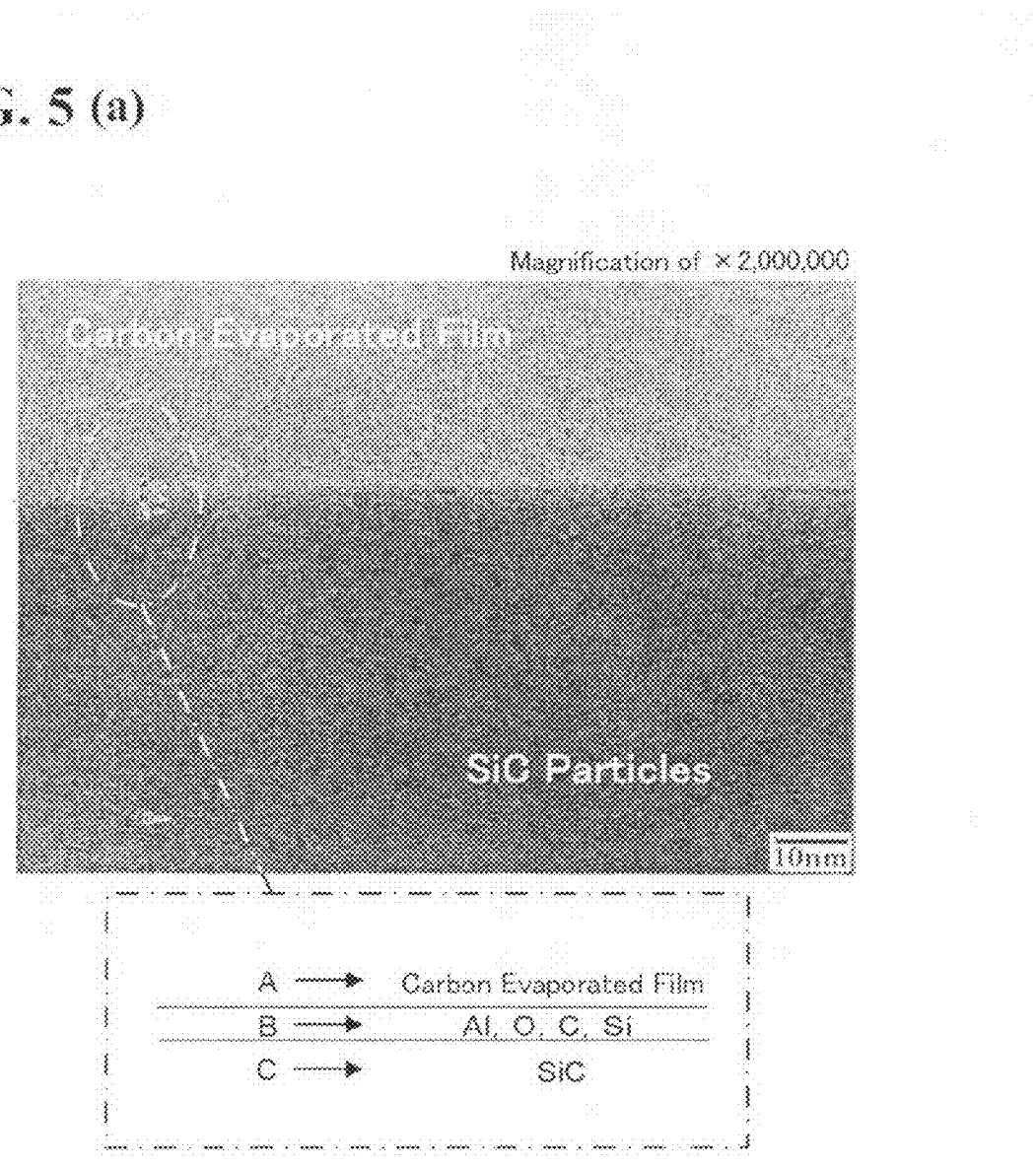
FIG. 5(a) is a TEM micrograph showing a cross section of a honeycomb structure according to an embodiment of the present invention in Example 2.
FIG. 5(b) is a graph showing the results of elemental analysis at site A, site B, and site C shown in FIG. 5(a).
Figure 5B:
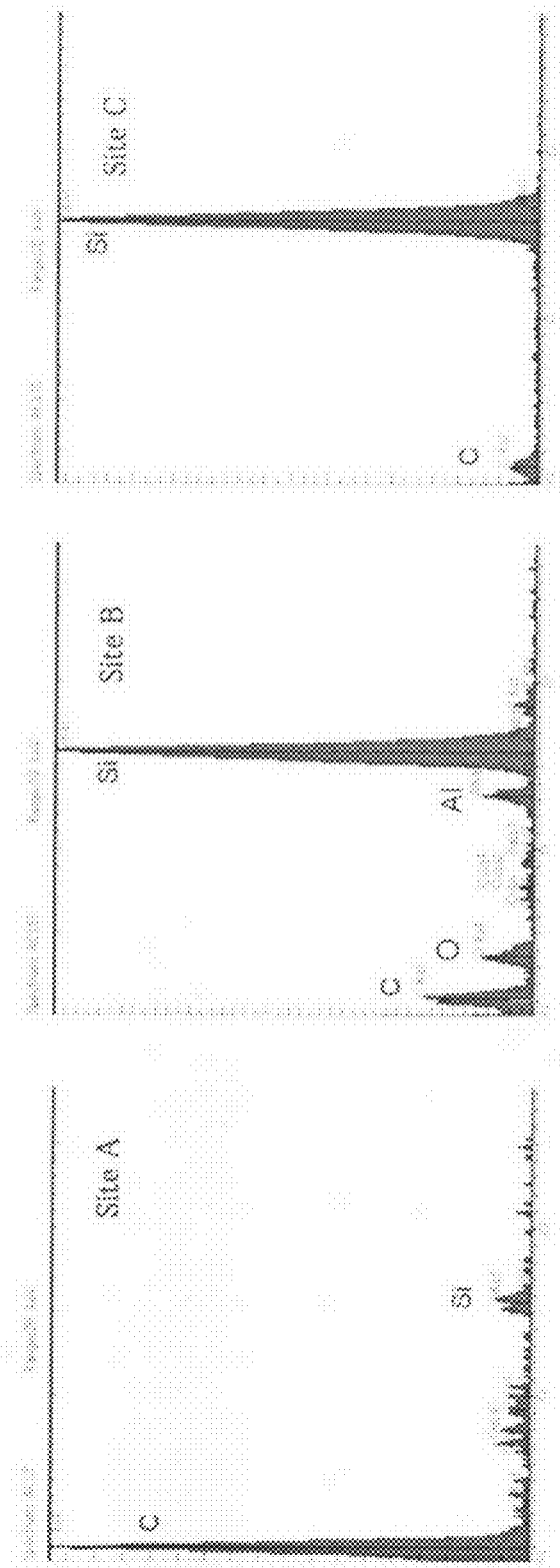

FIG. 5(a) is a TEM micrograph showing a slice of the sample of Example 2. FIG. 5(b) is a graph showing the results of elemental analysis at site A, site B, and site C shown in the micrograph of FIG. 5(a). As a result, at site C (bulk portion), only Si and C were detected. In contrast, at site B, in addition to Si and C, Al and O were detected. The distance between site B and site C is about 1 nm. As is evident from the results, Al resulting from alumina added is present on the surface of silicon carbide particles as an aggregate. Since a sample on which a carbon evaporated film was formed and which was subjected to SEM observation was used for TEM observation, at site A, carbon (C) resulting from the carbon evaporated film was detected.

The measurement results of the three-point bending strength, average pore size, thickness of the alumina layer, erosion by $KNO_3$ or $Ba(NO_3)_2$ with respect to Examples 1 to 9 are shown in Table 1, and those with respect to Examples 10 to 16 are shown in Table 2. As is evident from Tables 1 and 2, as the mixing ratio of alumina increases, the thickness of the alumina layer increases. In Example 8 in which alumina is not added and in Examples 9 and 15 in which fine particles of silicon carbide are not added, an alumina layer is not observed or if observed, the alumina layer is very thin and is eroded by $KNO_3$ and $Ba(NO_3)_2$. In contrast, in Examples 1 to 7, 10 to 14, and 16, erosion by $KNO_3$ or $Ba(NO_3)_2$ can be inhibited. It is assumed that when firing was performed in the presence of alumina, the thickness of alumina increased and alumina was vapor-deposited. Furthermore, in the sample in which metal silicon was mixed, the same results were obtained. It has been found from these results that according to the method for producing the honeycomb structure, it is possible to produce a honeycomb structure having high alkali resistance with a small number of steps. It has also been found that according to the production method, a thin alumina layer having nanometer-order thickness can be formed on the surface of silicon carbide. Furthermore, it has been found that the honeycomb structure 20 formed by this production method has high alkali resistance.

The invention claimed is:

1. A honeycomb structure which carries a catalyst component containing at least one element selected from the group consisting of alkali metals and alkaline earth metals and purifies exhaust emissions, comprising:
    ceramic particles which serve as an aggregate; and
    a ceramic particle protection material being present on the surface of the ceramic particles and being composed of an erosion-resistant material or a precursor thereof which inhibits the catalyst component from eroding the ceramic particles more effectively than an oxide of the element contained in the ceramic particles,
    wherein the ceramic particle protection material is present on the surface of the ceramic particles at a thickness of about 0.4 to about 1,000 nm.

2. The honeycomb structure according to claim 1, wherein the ceramic particles are composed of silicon carbide.

3. The honeycomb structure according to claim 1, wherein the ceramic particle protection material is present as a protective layer on the surface of the ceramic particles.

4. The honeycomb structure according to claim 1, wherein the erosion-resistant material is alumina.

5. A honeycomb structure which carries a catalyst component containing at least one element selected from the group consisting of alkali metals and alkaline earth metals and purifies exhaust emissions, comprising:
    ceramic particles which serve as an aggregate; and
    a ceramic particle protection material being present on the surface of the ceramic particles and being composed of alumina or aluminum oxycarbide,
    wherein the ceramic particle protection material is present on the surface of the ceramic particles at a thickness of about 0.4 to about 1,000 nm.

* * * * *